United States Patent [19]
Witzigreuter et al.

[11] Patent Number: 6,051,328
[45] Date of Patent: *Apr. 18, 2000

[54] METHOD AND APPARATUS FOR JOINING METAL-AIR CELLS

[75] Inventors: John D. Witzigreuter, Dallas; Christopher S. Pedicini, Canton, both of Ga.

[73] Assignee: AER Energy Resources, Inc., Smyrna, Ga.

[*] Notice: This patent is subject to a terminal disclaimer.

[21] Appl. No.: 09/081,170

[22] Filed: May 19, 1998

Related U.S. Application Data

[63] Continuation-in-part of application No. 08/858,582, May 19, 1997, Pat. No. 5,891,589.

[51] Int. Cl.[7] .......................... H01M 2/02; H01M 12/06
[52] U.S. Cl. ..................... 429/27; 429/82; 429/148; 429/153; 429/156; 29/623.4
[58] Field of Search ........................ 429/27, 82, 148, 429/151, 153, 156; 29/623.4

[56] References Cited

U.S. PATENT DOCUMENTS

| | | |
|---|---|---|
| 4,390,384 | 6/1983 | Turner . |
| 4,397,917 | 8/1983 | Chi et al. ................................. 429/26 |
| 4,416,955 | 11/1983 | Chi ............................................ 429/26 |
| 4,505,992 | 3/1985 | Dettling et al. .......................... 429/36 |
| 4,592,972 | 6/1986 | Juergens et al. ....................... 429/160 |
| 4,732,637 | 3/1988 | Dettling et al. . |
| 4,818,640 | 4/1989 | Fukuda et al. ........................... 429/38 |
| 4,973,532 | 11/1990 | Taskier et al. ........................... 429/62 |
| 5,035,045 | 7/1991 | Bowen et al. ......................... 29/623.2 |
| 5,063,123 | 11/1991 | Ohsuga et al. ........................... 429/38 |
| 5,114,767 | 5/1992 | Berns et al. ............................ 428/35.7 |
| 5,286,339 | 2/1994 | Klink ..................................... 29/623.4 |
| 5,288,565 | 2/1994 | Gruenstern ............................. 429/153 |
| 5,328,541 | 7/1994 | Usui et al. . |

(List continued on next page.)

FOREIGN PATENT DOCUMENTS

| | | |
|---|---|---|
| 673076 | 9/1995 | European Pat. Off. . |
| 2673488 | 9/1992 | France . |
| 1805819 | 10/1968 | Germany . |
| 4-249062 | 9/1992 | Japan . |
| WO93/19495 | 9/1993 | WIPO . |
| WO94/25995 | 11/1994 | WIPO . |

OTHER PUBLICATIONS

U.S. application No. 08/543,558, Pedicini et al., filed Oct. 16, 1995.

*Primary Examiner*—Stephen Kalafut
*Attorney, Agent, or Firm*—Jones & Askew, LLP

[57] ABSTRACT

Provided are metal-air cells for connecting to one another to form a battery stack. Two or more of the cells are joined by heat or chemical fusing to create the battery stack. Each of the metal-air cells have a case with an exterior surface and an interior surface that defines a chamber that contains an anode and an air cathode. The case defines air openings that extend between the exterior surface and the interior surface for supplying air from the environment exterior to the case to the air cathodes within the chamber. In one embodiment, each metal-air cell includes a plurality of protruding connector members and a plurality of protruding mechanical stops. Two cells are joined by fusing connector members of one cell to connector members of the other cell. During the fusing of the connector members, the mechanical stops of the cells being joined abut one another to arrest movement of the cells toward one another. The arresting causes a plenum to be uniformly defined between the cells. The fused connector members and abutting mechanical stops cooperate to define a three-dimensional truss-like system that provides structural integrity. In an alternative embodiment, at least one of the two metal-air cells to be joined includes a plurality of connectors and is otherwise free of stops. These connectors can be aligned with and fused to similar connectors on the other cell or be fused directly to the exterior surface of the other cell. Connector members and mechanical stops are preferably integrally formed with their case and interspersed with the air openings.

19 Claims, 7 Drawing Sheets

U.S. PATENT DOCUMENTS

| | | | |
|---|---|---|---|
| 5,328,777 | 7/1994 | Bentz et al. | 429/27 |
| 5,387,477 | 2/1995 | Cheiky | 429/26 |
| 5,510,203 | 4/1996 | Hamada et al. | 429/53 |
| 5,560,999 | 10/1996 | Pedicini et al. | 429/27 |
| 5,569,551 | 10/1996 | Pedicini et al. | 429/27 |
| 5,626,990 | 5/1997 | Miller et al. | 429/247 |
| 5,639,568 | 6/1997 | Pedicini et al. | 429/247 |
| 5,891,589 | 4/1999 | Witzigreuter et al. | 429/27 |

METHOD AND APPARATUS FOR JOINING METAL-AIR CELLS

RELATED APPLICATION

This application is a continuation-in-part application of application Ser. No. 08/858,582 which was filed on May 19, 1997, now U.S. Pat. No. 5,891,589.

TECHNICAL FIELD

The present invention relates generally to metal-air cells, and more particularly relates to connecting metal-air cells to form a battery stack.

BACKGROUND OF THE INVENTION

Metal-air cells include one or more air permeable cathodes and a metallic anode that are separated by an aqueous electrolyte. During discharge of a metal-air cell, such as a zinc-air cell, oxygen from the ambient air is converted at the cathode to hydroxide, zinc is oxidized at the anode by the hydroxide, and water and electrons are released to provide electrical energy. Metal-air batteries have a relatively high energy density because the cathode utilizes oxygen from ambient air as a reactant in the electrochemical reaction rather than a heavier material such as a metal or metallic composition. Metal-air cells are often arranged in stacks within a common housing to provide a sufficient amount of power output. The result is a relatively light-weight battery.

Both primary and secondary metal-air batteries have been developed. A rechargeable metal-air cell is recharged by applying voltage between the anode and the cathode of the cell and reversing the electrochemical reaction. Oxygen is discharged back to the atmosphere through the air-permeable cathode. Examples of rechargeable metal-air cells having an anode positioned between two air cathodes are disclosed in U.S. Pat. No. 5,569,551 and U.S. Pat. No. 5,639,568, the disclosures of which are incorporated herein by reference.

Problems common to rechargeable metal-air cells include cell swelling and anode relocation. Anode relocation contributes to capacity loss, operating voltage loss, and may cause an imbalance in current distribution between the cathodes. Although known designs have decreased the problem of anode relocation, further improvements can be made to further decrease capacity loss, operating voltage loss, and imbalances in current distribution between the cathodes.

One phenomenon that contributes to anode relocation is cell swelling. Cell swelling can occur, for example, during the initial discharge cycle of a cell. During a discharge cycle, oxygen is drawn into the cell. When the anode is discharged the volume of the discharge products is roughly twice the volume of the zinc metal. If a cell case is not properly constrained during this reaction, the cell case can swell. As a result, when the electrochemical reaction in the cell is reversed by recharging, the zinc anode can re-form in a distorted space within the cell. This can cause the shape of the anode to become distorted.

While conventional techniques for restraining cells attempt to preclude cell swelling and the resulting anode distortion, some cell swelling and anode distortion can still occur. For example, glues that are used to hold cells often fail due to the forces associated with cell swelling. An additional problem experienced with metal-air cells pertains to the mechanical brackets and spacers that are commonly used to restrain cells. It can be difficult and labor intensive to install certain types of these brackets and spacers.

Accordingly, there is a need for metal-air cells that can be joined in a manner that seeks to preclude cell swelling. Decreased cell swelling will result in decreased anode relocation, and will provide cells with increased power output, without compromising the efficiency and life of the cells.

SUMMARY OF THE INVENTION

The present invention seeks to provide metal-air cells and a method for joining those cells that prevents cell swelling, increases the structural rigidity and integrity of the cells, decreases anode relocation, provides increased power output without compromising the efficiency and life of the cells, and maintains the size of plenums defined between cells.

In accordance with the present invention, this object is accomplished by providing metal-air cells that include a two dimensional array of supports distributed over broad surface areas of the cells and extending into an air space, or plenum, defined between a pair of cells. The two dimensional array of supports defines a connection between adjacent cells which is formed by fusing. The cells are joined so that the supports provide a three dimensional, truss-like connection between the cells. The preferred methods of making the connections are heat fusing and chemical fusing.

The supports are protrusions extending from the exterior surface of at least one of the cells into the air space. During fusing, the protrusions extending from one cell abut the protrusions from another adjacent cell to arrest movement of the cells toward one another. In an alternative embodiment, the protrusions from one cell abut the exterior surface of the other adjacent cell. The arresting causes the plenum to be uniformly defined between the cells. Two or more cells can be joined to create a battery stack, and a plenum is defined between each pair of neighboring cells in the battery stack.

In accordance with one embodiment of the present invention, the object of the present invention is accomplished by providing metal-air cells that include protruding connector members and protruding mechanical stops. Two cells are joined by heating or applying solvent to the connector members of the cells, and then forcing the cells together so that the connector members of one cell are chemically or heat welded or fused to connector members of the other cell. Alternatively, the connector members of one cell are fused directly to the exterior of the other cell. The mechanical stops of one cell abut the mechanical stops of the other cell. The cells are joined so that their fused connector members extend through the plenum defined between the two cells and so that their connector members and their mechanical stops provide the three dimensional, truss-like connection between the cells. During the fusing of the connector members, the mechanical stops of the cells being joined abut one another to arrest movement of the cells toward one another.

More particularly, each of the preferred metal-air cells of the present invention have a similar outer case. Each case has an exterior surface and an interior surface that defines a chamber that contains an anode and air cathodes. The case further defines air openings that extend between the exterior surface and the interior surface for supplying air from the environment exterior to the cover to the air cathodes within the chamber. For each case having connector members and mechanical stops, the connectors and stops are interspersed with the air openings, arranged in arrays, and extend away from the exterior surface of the case. Each case includes a pair of oppositely oriented covers. The connector members and mechanical stops are preferably integrally formed with each of the covers.

In accordance with another embodiment of the present invention, the object of the present invention is accomplished by providing metal-air cells that include protruding connector members which extend into the plenum. The connector members are preferably obround and are distributed over the broad surface area of a cell. Two cells are joined by heating or applying solvent to the connector members of at least one of the cells. The connector members on one of the cells are joined by chemical or heat fusing to the connector members of the other cell to define the connection between the cells. Alternatively, the connector members of one cell are fused directly to the exterior of the other cell. As in the earlier embodiment, connector members are interspersed with the air openings and are preferably integrally formed with a cover.

Other objects, features and advantages of the present invention will become apparent upon reviewing the following description of preferred embodiments of the invention, when taken in conjunction with the drawings and the appended claims.

DETAILED DESCRIPTION OF THE INVENTION

Figure 1:
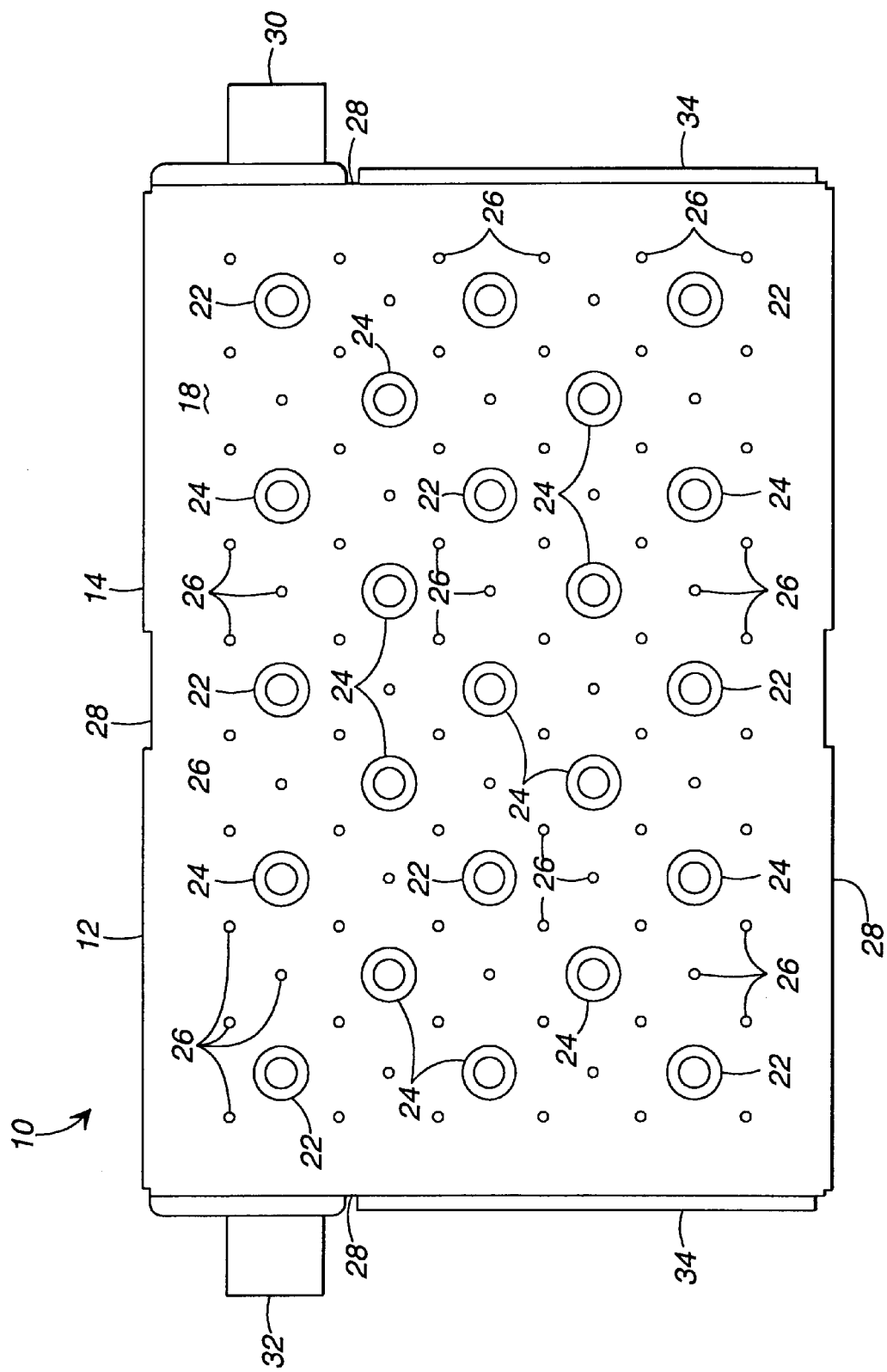
FIG. 1 is a plan view of a metal-air cell that includes multiple protruding connector members and mechanical stops, in accordance with one embodiment of the present invention.
Figure 2:
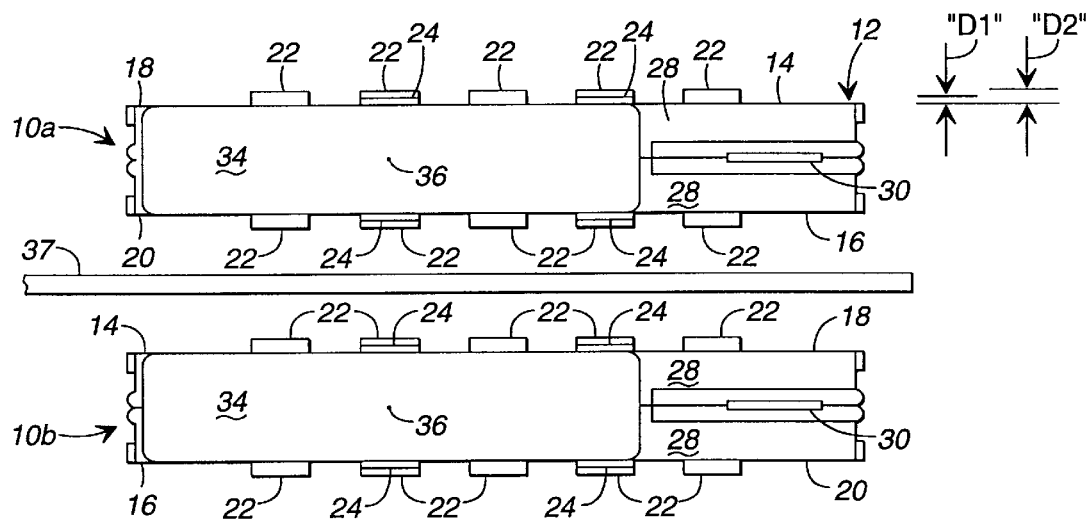
FIG. 2 is a side elevational view of two metal-air cells of the type depicted in FIG. 1, which are in the process of being joined.
Figure 5:
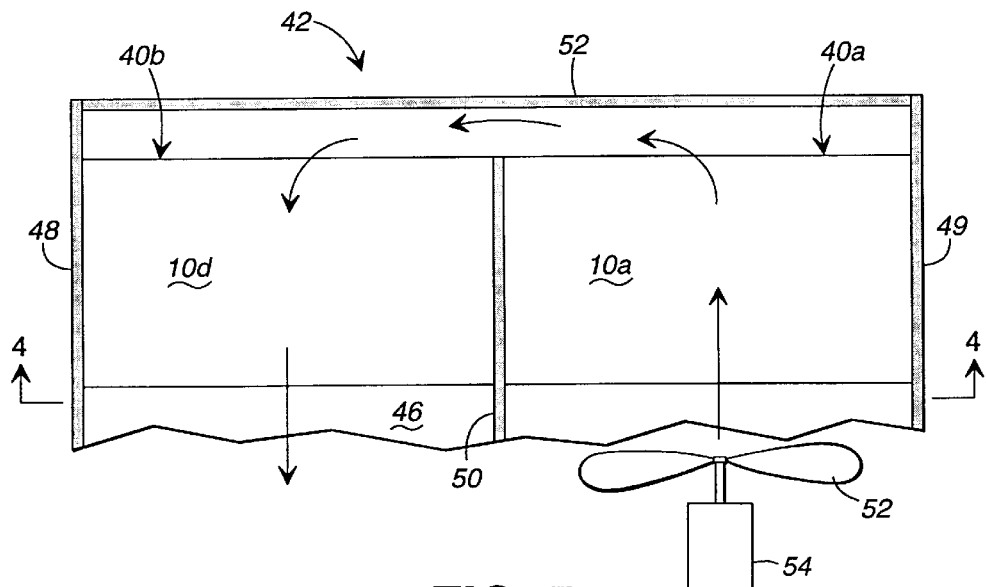
FIG. 5 is a partially cut-away, top cross-sectional view of the air manager of FIG. 4, taken along line 5—5 of FIG. 4.
Figure 6:
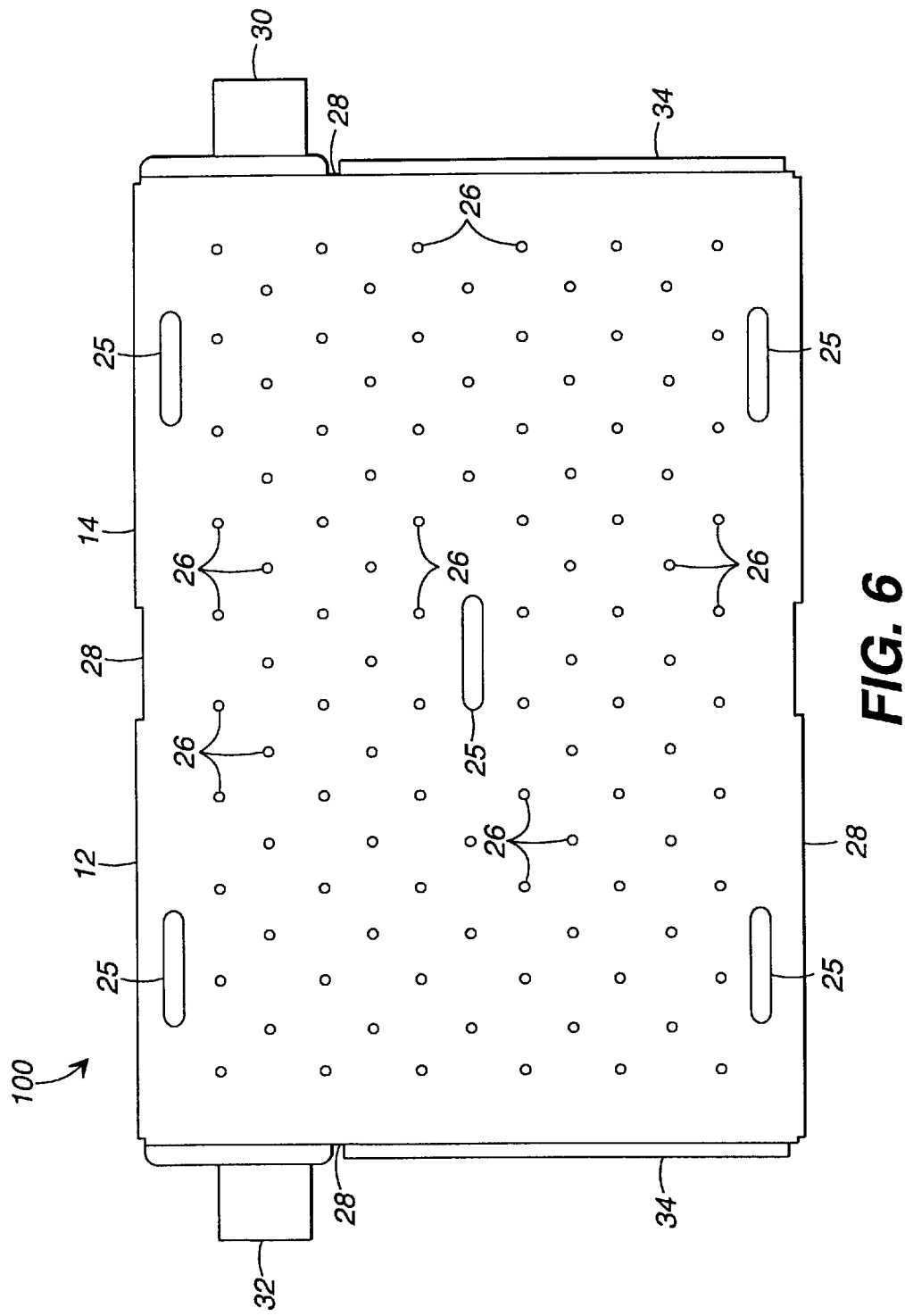
FIG. 6 is a plan view of a metal-air cell that includes multiple protruding connector members, in accordance with another embodiment of the present invention.
Figure 7:
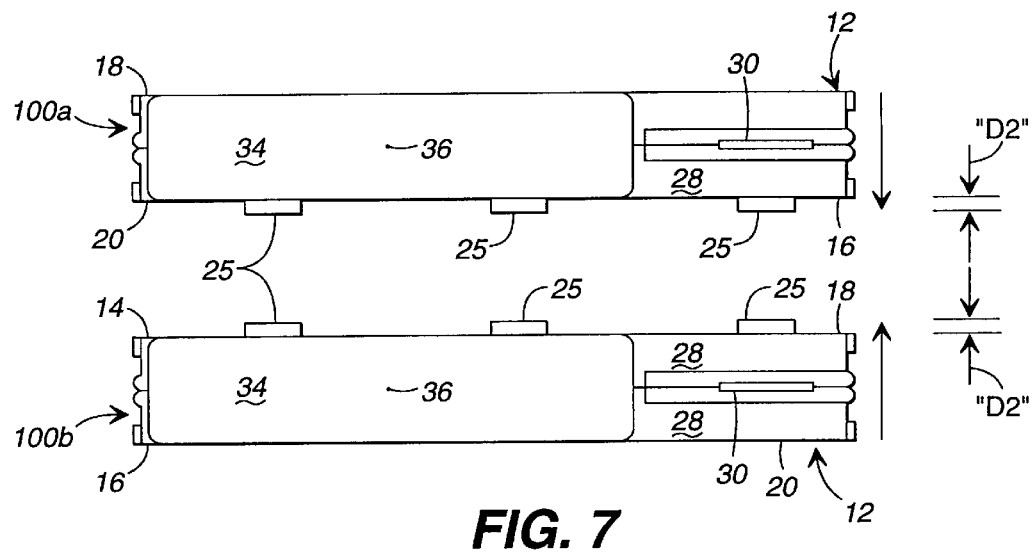
FIG. 7 is a side elevational view of two metal-air cells of the type depicted in FIG. 6, which are in the process of being joined.
Figure 8:
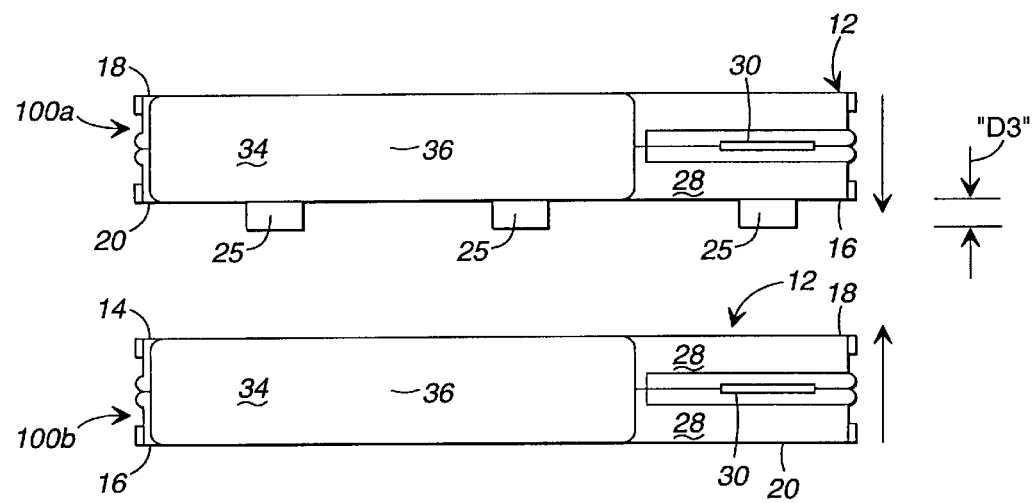
FIG. 8 is a side elevational view of metal-air cells and modified connector members.

Referring now to the drawings in which like numerals indicate like elements throughout the several views, FIGS. 1 and 6 depict separate embodiments of the external elements of metal-air cells 10 and 100 respectively. FIG. 2 depicts the external elements of metal-air cells 10a, 10b and FIGS. 7 and 8 depict the external elements of the metal-air cells 100a, 100b. FIG. 8 is a variation of the embodiment shown in FIGS. 6 and 7. In the remaining FIGS. 3–5 and 9–12, various combinations of metal-air cells 10, 100 are depicted. Throughout this disclosure, it should be understood that each of the cells 10a–f are generally identical to each other and that each of the cells 100a–h are generally identical to each other, except for slight modifications in the manner in which one cell is connected to another, as will be discussed in greater detail below. Therefore, unless indicated otherwise, discussion of the cell 10 should be understood to pertain to each of the cells 10a–f and discussion of the cell 100 should be understood to pertain to each of the cells 100a–h.

FIGS. 1 and 6 are respective top plan views of the cells 10 and 100. A bottom plan view of the cell 10 of FIG. 1 is a mirror image of the top plan view shown in FIG. 1. On the other hand, the bottom plan view of the cell 100 shown in FIG. 6 is a generally smooth and level surface. FIGS. 2, 3, and 7–10 are side elevational views of cells 10, 100, and views of the cells 10, 100 from the opposite sides are mirror images of the provided side elevational views, except for the arrangement of the cathode tabs 30 and anode tabs 32 (FIGS. 1 and 6).

Figure 3:
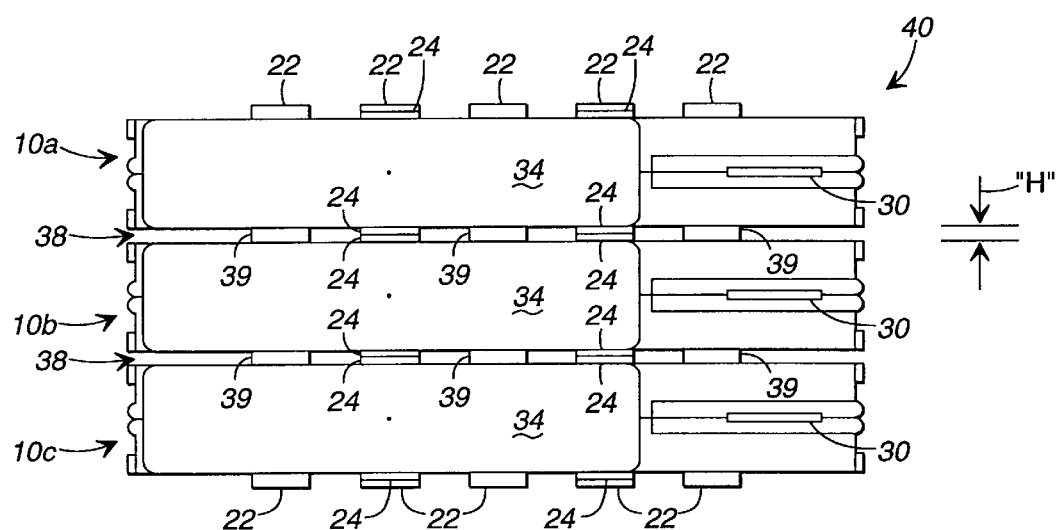
FIG. 3 is a side elevational view of three metal-air cells of the type depicted in FIG. 1, which have been joined to form a battery stack.

Referring to FIGS. 1, 2 and 6–8, each cell 10, 100 includes a case 12 that includes an upper cover 14 joined to a lower cover 16 (FIG. 2). The upper cover 14 includes an upper cathode mask wall 18, and the lower cover 16 includes a lower cathode mask wall 20 (FIG. 2). Each of the cathode mask walls 18, 20 include an interior surface and an exterior surface. Referring to FIGS. 1 and 2 in particular, multiple protrusions, which are referred to as connectors 22 and stops 24, extend perpendicularly from the exterior surface of each of the cathode mask walls 18, 19. As will be discussed in greater detail below, the connectors 22 and stops 24 are used to join one metal-air cell 10 to another, as indicated by FIGS. 2 and 3. Connectors 22 and stops 24 are distributed over the exterior surface area of each of the cathode mask walls 18, 20 in a manner that seeks to allows the cells 10 to be easily joined and prevent cell swelling. As shown in FIG. 3, plenums 38 are uniformly defined between the cells 10a–c.

Each of the connectors 22 and stops 24 are annular and extend from their respective cathode mask wall 18, 20 so that they are in the form of cylinders. The axes of those cylinders are perpendicular to the respective cathode mask walls 18, 20. The connectors 22 and stops 24 are arranged in a two-dimensional array that includes a plurality of columns and rows. Each of the stops 24 includes a terminus that is a distance "D1" (FIG. 2) from its respective cathode mask wall 18, 20, and each of the connectors 22 includes a terminus that is a distance "D2" (FIG. 2) from its respective cathode mask wall 18, 20. Throughout this disclosure, the terminus of a connector 22 or stop 24 is that portion of the connector 22 or stop 24 that is most distant from the mask wall 18, 20 from which the connector 22 or stop 24 originates. The distance "D2" is greater than the distance "D1," and those distances are preferably 0.06 inches and 0.03 inches, respectively. For each cover 14, 16, the terminuses of the stops 24 protruding from that cover lie in a common first plane, and the terminuses of the connectors 22 protruding from that cover lie in a common second plane, and each of those planes are parallel to their respective mask walls 18, 20. Thus, for each cover 14, 16, the terminuses of the stops 24 can be characterized as cooperating to define a generally planar, first composite mounting surface, and the terminuses of the connectors 22 can be characterized as cooperating to define a generally planar, second composite mounting surface.

Referring to the alternative embodiment shown in FIGS. 6 and 7, each cell 100 includes multiple protrusions referred to as connectors 25. FIG. 8 illustrates a modification showing connectors 25 on only one of the adjacent cells that are to be joined. Similar to the connectors 22 and stops 24, the connectors 25 also extend perpendicularly from the exterior surface of each of the cathode mask walls 18, 20. As will be discussed in greater detail below, the connectors 25 are used to join one metal-air cell to another metal-air cell, as indicated by FIGS. 7–10. The connectors 25 are distributed over the exterior surface area of a cathode mask wall.

As best seen in FIG. 6, the connectors 25 are preferably obround is that they have two parallel sides and two semi-circular ends. The connectors 25 extend from their respective cathode mask wall 18, 20 and their axis is perpendicular to the respective cathode mask walls 18, 20. The connectors 25 are arranged in a two-dimensional array as shown in FIG. 6. In FIG. 3, the terminus of a connector 25 is the distance "D2" from its respective cathode mask wall 18, 20. The distance "D2" is preferably the same distance as previously described in association with the connectors 22. In FIG. 8, the terminus of the connector 25 is a distance "D3" from its respective cathode mask wall 20. The distances "D2" and "D3", in the context of utilizing connectors 25, characterize the distance between a terminus and its respective cathode wall in the two different embodiments which utilize connectors 25 as shown FIGS. 7 and 8. The distance "D3" is approximately twice the height of "D2".

Figure 9:
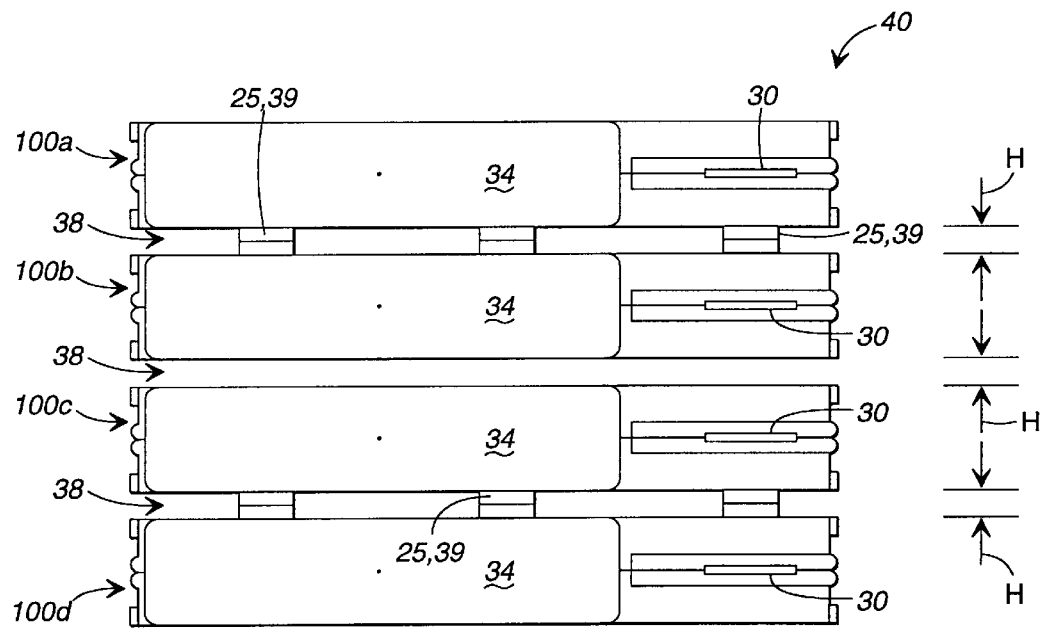
FIG. 9 is a side elevational view of four metal-air cells of the type depicted in FIGS. 6 and 7, which have been joined to form a battery stack.
Figure 10:
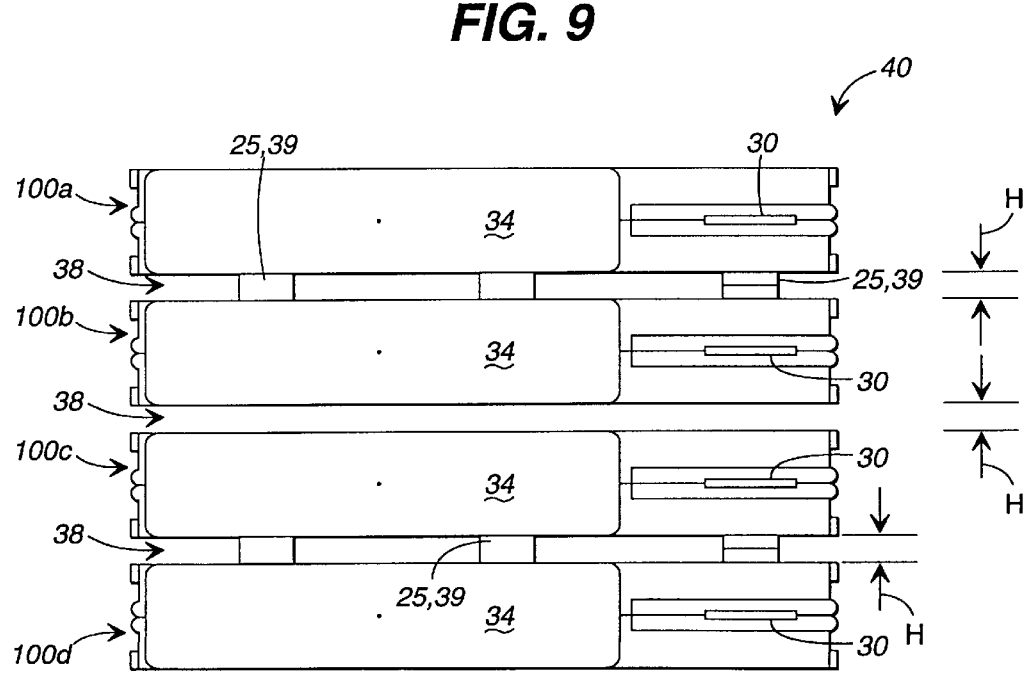
FIG. 10 is a side elevational view of four metal-air cells of the type depicted in FIGS. 6 and 8, which have been joined to form a battery stack.

The connectors 25 in FIG. 8 are longer than the connectors 25 in FIG. 7 because the connectors 25 on cell 100a in FIG. 8 are configured to abut the exterior surface of cell 100b and define the uniform plenum between the cell 100a and cell 100b (FIG. 10). Cell 100b in FIG. 8 does not have any connectors 25. In FIG. 10, the terminus of the connectors 25 on cell 100a are fused to the exterior surface of cell 100b to form the supports 39. In FIG. 9, on the other hand, cell 100b includes connectors 25 which abut the connectors 25 on cell 100a. Their terminuses are fused together such that they become the single support 39. Preferably, after fusing, the heights of the resulting plenums 38 shown in FIGS. 9 and 10 are substantially the same.

In accordance with the present invention, with the exception of the connectors 22, stops 24, and connectors 25, the cells 10 and 100 are generally identical to the metal-air cells disclosed in U.S. Pat. No. 5,569,551, or U.S. Pat. No. 5,639,568 which have been incorporated by reference. Therefore, unless expressly indicated otherwise or apparent to those reasonably skilled in the art, the cells 10, 100 should be understood to function and be constructed as disclosed in the documents incorporated by reference. As mentioned in those documents, each case 14, 16 is preferably molded from a light-weight plastic, such as polypropylene, that is not electrically conductive. Alternatively, the cells 10, 100 may be constructed of acrylonitrile butadiene styrene (ABS) or another non-conductive plastic. It is preferred that the cells be made of ABS when chemically fusing to join adjacent cells. Regardless of the choice of material used to make the cells, the connectors 22, stops 24 and connectors 25 are preferably integrally formed with their respective cover 14, 16.

As discussed in the documents incorporated by reference, each cathode mask wall 18, 20 defines multiple air openings 26 that extend between the interior surface and the exterior surface of the respective cathode mask wall 18, 20. Only a select few of the air openings 26 are specifically pointed to in FIGS. 1 and 6 in an effort to clarify the view. The number and arrangement of the openings 26 in the cells 10, 100 of the present invention vary from the number and arrangement of the openings disclosed in the documents incorporated by reference. Eighty two openings 26 are depicted in FIG. 1 and one hundred and two openings are depicted in FIG. 6. Further, in FIG. 1, each of the connectors 22 and stops 24 are generally surrounded by air openings 26, and the air openings 26 are interspersed with the connectors 22 and stops 24. In FIG. 6, each of the connectors 25 are also generally surrounded by air openings 26, and the air openings 26 are interspersed with the connectors 25.

For each case 12, the interior surfaces of the cathode mask walls 18, 20 partially bound an internal chamber. That internal chamber is further defined by side walls 28 (FIGS. 2, 7 and 8) that extend from the interior surfaces of the cathode mask walls 18, 20. As also discussed in the documents incorporated by reference, each cell 10, 100 includes within its internal chamber an anode positioned between a pair of air cathodes. For each cell 10, 100, one of the cathodes is adjacent the interior surface of the mask wall 18 and communicates with the environment at the exterior surface of the mask wall 18 through the openings 26 defined through the mask wall 18. Similarly, for each cell 10, 100, the other cathode is adjacent the interior surface of the mask wall 20 and communicates with the environment at the exterior surface of the mask wall 20 through the air openings 26 defined through the mask wall 20. Each cell 10, 100 further includes a cathode tab 30 which is the positive terminal of the cell, and an anode tab 32 that is the negative terminal of the cell. Each cell 10, 100 further includes a pair of vent caps 34, each of which includes a gas exit hole 36 (FIGS. 2, 7 and 8).

The manner in which cells 10, 100 are joined is an important aspect of the present invention. In accordance with the present invention, the cells 10, 100 are joined in a manner that seeks to prevent cell swelling and anode relocation. More particularly, in one embodiment of the present invention, the cells 10 are joined by a three dimensional, truss-like system of fused connectors 22 and abutting stops 24 that provides structural integrity. As mentioned previously, the connectors 22 and stops 24 are preferably identically arranged on each cover 14, 16. Therefore, when the cells 10a, 10b are aligned and proximate to one another as depicted in FIG. 2, the downward facing connectors 22 of the cell 10a are aligned with the upward facing connectors 22 of the cell 10b. The stops 24 are arranged relative to the connectors 22 so that by aligning the connectors 22 as mentioned above, the downward facing stops 24 of the cell 10a are aligned with the upward facing stops 24 of the cell 10b.

When two cells such as the cell 10a and the cell 10b are to be joined by heat fusing, they are generally aligned as discussed above, and then moved toward a generally planar, broad hot plate 37. The hot plate 37 is heated to a temperature above the melting temperature of the connectors 22. Each of the cells 10a, 10b is moved toward the hot plate 37 so that the terminuses of the downward facing connectors 22 on the cell 10a and the terminuses of the upward facing connectors 22 on the cell 10b contact the hot plate 37 and are heated to above their melting temperature. It is preferable for the connectors 22 being heated not to be substantially deformed during contact with the hot plate 37. Therefore, only slight force is used to hold the cells 10a, 10b against the hot plate 37 so that the connectors 22 being heated are not substantially deformed. That is, it is desirable for the connectors 22 being heated to maintain their general shaped so that the associated stops 24 do not contact the hot plate 37 and are not heated above their melting point or deformed.

Once the desired connectors 22 are heated as discussed above, the cells 10a, 10b and the hot plate 37 are arranged so that the hot plate 37 is no longer positioned between the cells 10a, 10b. Then, while the cells 10a, 10b are aligned as discussed above, the cells 10a, 10b are moved together so that the terminus of each downward facing connector 22 of the cell 10a is aligned with and contacts a corresponding terminus of an upward facing connector 22 of the cell 10b. The cells 10a, 10b are forced together and continue to move toward one another as the heated connectors 22 deform and fuse together. Movement of the cells 10a, 10b toward one another is arrested when the downward facing terminuses of the stops 24 of the cell 10a abut the upward facing terminuses of the stops 24 of the cell 10b. As the cells 10a, 10b are forced toward one another, for each of the resulting pairs of connectors 22 (each pair consisting of one of the downward facing connectors 22 of the cell 10a and one of the upward facing connectors 22 of the cell 10b), their terminuses are welded or fused together such that they become the single support 39 (FIG. 3) that is connected between the cells 10a, 10b. The touching terminuses of the stops 24 do not fuse, but rather are maintained intact and rigid so that they function to arrest movement of the cell 10a toward the cell 10b so that an air space or plenum 38 (FIG. 3), which is of uniform height along its length and width, is defined between the cell 10a and the cell 10b.

In another embodiment of the present invention, the cells 100 are joined by a three dimensional, truss-like system of fused connectors 25 that provides structural integrity. As shown in FIGS. 7 and 9, the connectors 25 are preferably identically arranged on each cover 14, 16. Therefore, when the cells 100a, 100b are aligned and proximate to one another as depicted in FIG. 7, the downward facing connectors 25 of the cell 100a are aligned with the upward facing connectors of the cell 100b.

Alternatively, as shown in FIG. 8, the lower cover 16 of the cell 100a is aligned with the upper cover 14 of the cell 100b such that the downward facing connectors 25 extending from the lower cover 16 may be fused directly to the exterior surface of the upper cover 14. In this modified embodiment, there is only one set of connectors 25, having heights equal to "D3", extending from the cell 100a in order to fuse cell 100a with cell 100b and form plenums 38 (FIG. 10).

In another embodiment of the present invention (not shown), a cell 10, 100 may be connected to a respective adjacent cell 10, 100 by one or more air permeable supports. The cells are connected by the air permeable supports at locations spread two-dimensionally over the exterior surfaces of the cells. These air permeable supports may be referred to as continuous supports in that they continuously extend two-dimensionally over the exterior surfaces of the cells.

Another method of fusing is chemical fusing which may be used in place of heat fusing. Chemical fusing is facilitated without a hot plate 37 by applying a solvent (not shown) to the connectors 22 or the connectors 25 in order to chemically bind one cell to another. While any convenient solvent may be used, depending upon the type of plastic used for connecting members, methyl ethyl ketone (MEK), methyl chloride or methyl acetate have been used satisfactorily to create a joint between similar or identical plastic connecting members.

A solvent may be used in place of heat fusing in either of the above-described embodiments of the present invention when using a solvent-bondable plastic. With chemical fusing, the solvent is placed between each of the surfaces at the point where each is to be fused together. For example, in the embodiment having connectors 25, the solvent is placed on the connectors of one the metal-air cells that are to be joined. Alternatively, the solvent may be placed on the connectors of each of the metal-air cells. The preferred method of placing the solvent at the desired location is with the use of a syringe. The syringe is suitable for controlling the position as well as the amount of solvent deposited on a metal-air cell.

In order to chemically fuse a pair of metal-air cells 10, 100 together, the solvent dissolves a portion of the plastic defining a protrusion, such as a connector 25, when the solvent is applied to the terminus of the protrusion. Once a portion of the protrusion has been dissolved by the solvent, the metal-air cells 100 having the dissolved protrusions is mated with the protrusions of the other metal-air cell 100. Alternatively, the metal-air cell 100 having the partially dissolved protrusions may be mated directly to the exterior surface of the metal-air cell 100 as shown in FIG. 10. As noted earlier, each of the metal-air cells 10, 100 to be joined may have solvent deposited on their respective protrusions. However, a pair of metal-air cells may be chemically fused by applying the solvent to only the protrusions of one of the metal air-cells. The amount of solvent deposited on each protrusion is dependent on whether solvent is deposited on the protrusions of both metal-air cells. More solvent may be required on a protrusion if the opposing protrusion is otherwise free of solvent. Once a pair of metal-air cells have been joined, the solvent must diffuse and evaporate so that solid connections are formed. The dissolved plastic hardens to fuse the metal-air cells together. The two protrusions may also be mated together without first supplying solvent. The solvent can then be applied to the resulting joint. The solvent will wick into the joint by way of capillary action and form a fused joint within a short time, such as ten to fifteen seconds.

In connection with the embodiments shown in FIGS. 6–12, those skilled in the art understand that the movement of a cell 100 towards another cell 100 may be arrested by stops such as the stops 24 described above. If no stops are provided to determine the distance between adjacent cells, the distance is determined by moving the cells toward one another until they reach the determined distance with the solvent-coated connectors 25 engaging one another.

It should be noted that during the chemical fusing process, the deformation of the connectors 22 and 25 should not be as much as occurs during heat fusing. Consequently, the distance of the terminuses of the connectors and stops from its respective mask wall may be varied accordingly to achieve the desired height of the resulting plenum 38.

Referring to FIG. 3, the cells 10 have been fused to one another by one of the above-discussed procedures. The height "H" of the plenum 38 defined between the cells 10 is equal to twice the distance "D1" wherein "D1" is the height of the stops 24. Any number of cells can be joined by repeating one of the above-disclosed fusing processes. For example, in FIG. 3 a cell 10c has been fused to the bottom of the cell 10b to define a battery stack 40. Battery stacks 40 can include two or more cells. FIGS. 9 and 10 each show cells 100a and 100b fused together, along with cells 100c and 100d fused together, to also form a battery pack 40. However, in FIG. 9, the height "H" of the plenum 38 may be slightly less than twice the distance "D2" and, in FIG. 10, the height "H" may be slightly less than the distance "D3". The heights "H" in FIGS. 9 and 10 may be slightly less because the cells 100 are moved towards one another, and the dissolved areas may shorten slightly as the members come together, until they are arrested at a predetermined point. Inconsistencies in the amount of deformation in the connectors lead to variations in the height "H".

Figure 4:
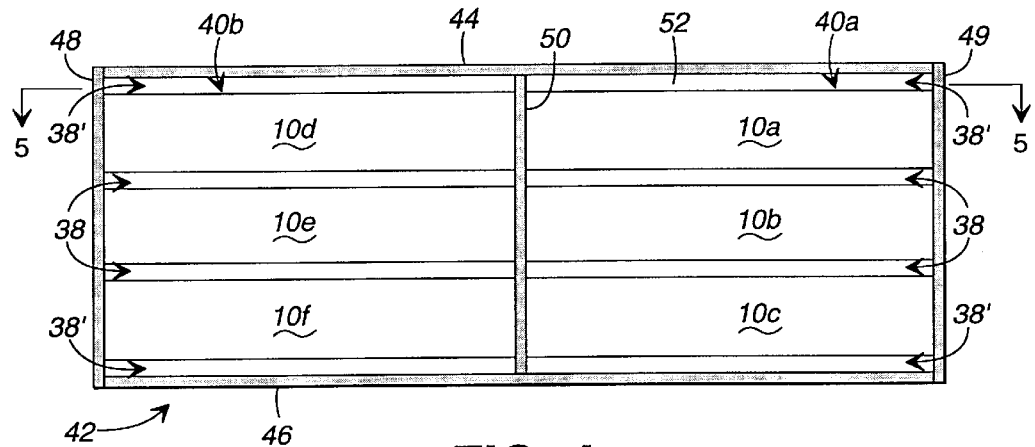
FIG. 4 is a side cross-sectional view of an air manager that is housing two battery stacks of the type depicted in FIG. 3, taken along line 4—4 of FIG. 5.

FIGS. 4 and 5 are schematic, cross-sectional views of battery stacks 40a, 40b (each of which is generally identical to the battery stack 40 of FIG. 3) disposed within an exemplary air manager 42. FIG. 4 is a cross-sectional view of the air manager 42 from the reference of line 4—4 in FIG. 5. FIG. 5 is a cross-sectional view of the air manager 42 from the reference of line 5—5 in FIG. 4. FIG. 4 is schematic in nature because none of the connectors 22 (FIGS. 1–3), stops 24 (FIGS. 1–3), or supports 39 (FIG. 3) are shown, in an effort to clarify the view.

Figure 11:
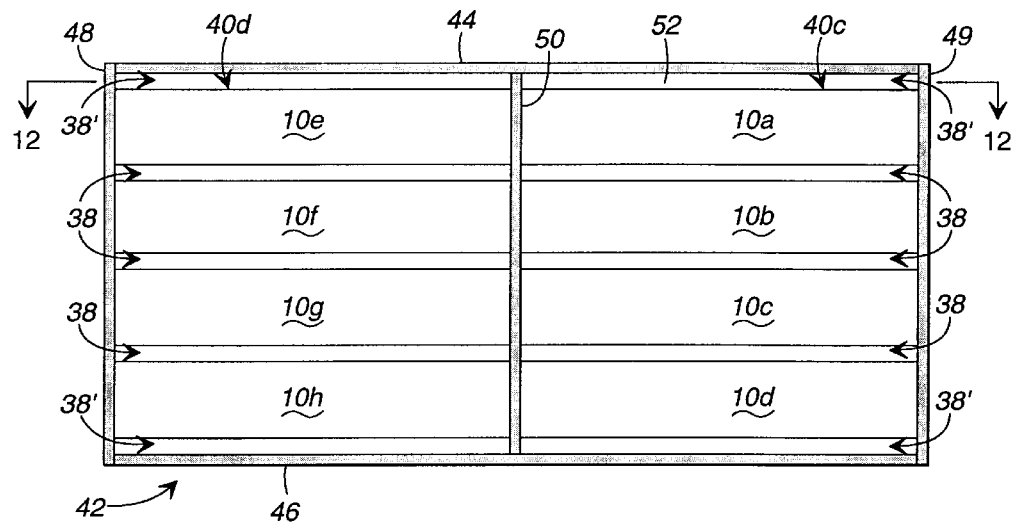
FIG. 11 is a side cross-sectional view of an air manager that is housing two battery stacks of the type depicted in FIGS. 9 or 10 taken along line 11—11 of FIG. 12.
Figure 12:
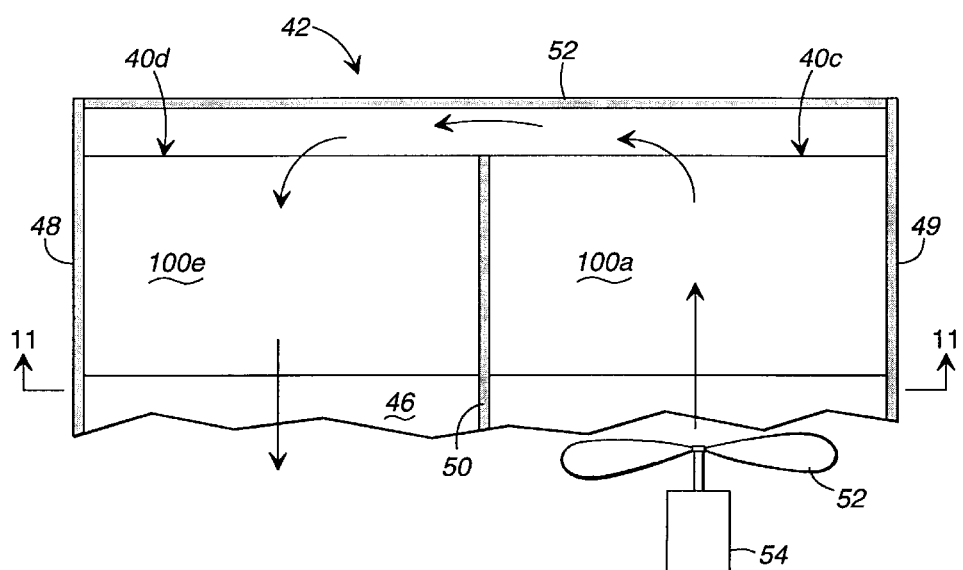
FIG. 12 is a partially cut-away, top cross-sectional view of the air manager of FIG. 11, taken along line 12—12 of FIG. 11.

FIGS. 11 and 12, depicting an alternative embodiment, are schematic, cross sectional views of battery stacks 40c, 40d (each of which is generally identical to the battery stack 40 of FIGS. 9 or 10) disposed within the air manager 42. FIG. 11 is a cross-sectional view of the air manager 42 from the reference of line 11—11 in FIG. 12. FIG. 12 is a cross-sectional view of the air manager 42 from the reference of line 12—12 in FIG. 11. FIG. 11 is schematic in nature because none of the connectors 25 (FIGS. 6–8) or supports 39 (FIGS. 9 and 10) are shown, in an effort to clarify the view.

The cells 10, 100 can be utilized in different types of air managers, and the exemplary air manager 42 is presented only as one possible example. For example, the cells 10, 100 can be used in the air manager disclosed in U.S. patent application Ser. No. 08/556,613, the disclosure of which is incorporated herein by reference. That air manager of that application includes a central fan defining a flow axis, and flow-paths extending from and returning to the flow axis to supply cells, such as cells 10a–10f in cell stacks 40a, 40b, on opposite sides of the flow axis.

The exemplary air manager 42 of FIGS. 4 and 11 includes an upper panel 44 and a lower panel 46 that are fixed with respect to one another. The upper panel 44 and the lower panel 46 of the air manager 42 extend between and are joined to side panels 48, 49. A partition panel 50 extends between the upper panel 44 and the lower panel 46. In FIG. 4, panel 50 separates the battery stack 40a from the battery stack 40b. In FIG. 11, panel 50 separates the battery stack 40c from the battery stack 40d. As shown in FIGS. 5 and 12, a rear panel 52 spans between the upper panel 44, the lower panel 46, and the side panels 48, 49.

The tops and bottoms of the stacks 40a, 40b can be fused to or abutted against the upper panel 44 and the lower panel 46, respectively. In the embodiment depicted in FIGS. 1–3, the terminuses of the upward facing connectors 22 of the cells 10a, 10d can be fused with the interior surface of the upper panel 44. With heat fusing, the upward facing connectors 22 of the cells 10a, 10d can be heated above their melting temperature by the hot plate 37 (FIG. 2), or some other means, and then be forced against the heated interior surface of the upper panel 44. During the fusing of the connectors 22 to the upper panel 44, the terminuses of the upward facing stops 24 of the cells 10a, 10d abut the panel 44 to arrest movement of the cells 10a, 10b relative to the upper panel 44 so that air spaces or plenums 38', which are of uniform height along their lengths and widths, are defined between the cells 10a, 10d and the upper panel 44. Alternatively, the terminuses of the upward facing connectors 22 of the cells 10a, 10d can remain at ambient temperature and be abutted to the upper panel 44 so that the terminuses of the upward facing stops 24 of the cells 10a, 10d do not contact the upper panel 44.

Similarly, the terminuses of the downward facing connectors 22 of the cells 10c, 10f can be heated by the hot plate 37, or some other means, and then be forced against the heated interior surface of the lower panel 46 so that those heated connectors 22 fuse to the lower panel 46. During that fusing, the terminuses of the downward facing stops 24 of the cells 10c, 10f abut the lower panel 46 to arrest movement of the cells 10c, 10f relative to the lower panel 46 so that plenums 38', which are of uniform height along their lengths and widths, are defined between the cells 10a, 10d and the lower panel 46. Alternatively, the terminuses of the downward facing connectors 22 of the cells 10c, 10f can remain at ambient temperature and be abutted to the lower panel 46 so that the terminuses of the downward facing stops 24 of the cells 10c, 10f do not contact the lower panel 46.

Alternatively, the embodiments depicted in FIGS. 6–10 may also include connectors 25 extending upward from the cells 100a, 100e (not shown) to fuse with the interior surface of the upper panel 44. Also, connectors 25 may extend downward from the cells 100d, 100h (not shown) to fuse with the interior surface of the lower panel 46 so that those connectors 25 fuse to the lower panel 46.

Although the previously described embodiments having connectors 22 or connectors 25 fused to the upper and lower interior surfaces were generally described in terms of using heat fusing, such embodiments may also be obtained by using chemical fusing.

In accordance with aforementioned fusing procedures for forming the plenums 38', the heights of the plenums 38' are equal to the height "D1". In accordance with aforementioned non-fusing procedures for forming the plenums 38', the heights of the plenums 38' are equal to the height "D2". Alternatively, special covers can be used on the tops of cells 10a, 10d, 100a, 100e and on the bottoms of cells 10c, 10f, 10d, 100h to obtain different heights of the plenums 38'.

As shown in FIG. 5, a fan, which is depicted toward the front of the air manager 42 and includes an impeller 52 driven by a motor 54, forces air into the fronts of the plenums 38, 38' of the battery stack 40a. The air-flow exits the rear of the plenums 38, 38' of the battery stack 40a, and then flows from rear to front through the plenums 38, 38' of the battery stack 40b, as indicated by arrows in FIG. 5. FIG. 12 illustrates the air-flow into the fronts of the plenums 38, 38' of the battery stack 40c and out the rear of the plenums 38, 38' of the battery stack 40d, as indicated by the arrows.

It should be understood that the foregoing relates only to exemplary embodiments of the present invention, and that numerous changes may be made therein without departing from the spirit and scope of the invention as defined by the following claims.

What is claimed is:

1. A method of joining a first metal-air cell that comprises a two dimensional array of protruding first connecting members to a second metal-air cell, comprising the steps of:
   fusing the connecting members to the second cell; and
   providing an air space between the first cell and the second cell, the providing step comprising the step of arresting the movement of the first cell toward the second cell with a plurality of first mechanical stops disposed between the first cell and the second cell.

2. The method of claim 1, wherein the fusing step comprises the steps of applying solvent to the first connecting members and moving the first connecting members into contact with the second cell.

3. The method of claim 1, wherein the first connecting members deform in response to the fusing step, and the deforming of the first connecting members is diminished by the arresting step so that the air space between the first cell and the second cell is uniform.

4. The method of claim 1,
wherein the second cell comprises an array of protruding second connecting members, and
wherein the fusing step comprises the step of aligning the first connecting members with the second connecting members so that terminuses of the first connecting members engage and fuse with terminuses of the second connecting members.

5. The method of claim 4,
wherein the first mechanical stops extend from the first cell and a plurality of second mechanical stops extend from the second cell, and
wherein the aligning step aligns the first mechanical stops with the second mechanical stops so that terminuses of the first mechanical stops abut terminuses of the second mechanical stops.

6. The method of claim 1, wherein the first cell comprises a first cover that defines a plurality of openings that are interspersed with the first connecting members and extend through the first cell for supplying air from the air space to a cathode of the first cell.

7. The method of claim 1,
wherein the first metal-air cell comprises a cover comprising an exterior surface and an interior surface at least partially defining a chamber that contains an anode and an air cathode, the cover defining a plurality of openings extending between the exterior surface and the interior surface for supplying air from an air space adjacent the exterior surface to the air cathode,
wherein the connecting members are integrally formed with the cover and extend from the exterior surface into the air space to a first distance from the exterior surface, and
wherein the mechanical stops are integrally formed with the cover and extend from the exterior surface into the air space to a second distance from the exterior surface, wherein the second distance is greater than the first distance.

8. A metal-air battery, comprising:
a first cell comprising an exterior first surface;
a second cell connected to the first cell and comprising an exterior second surface that is spaced from the first surface so that an air space is defined between the first surface and the second surface, the cells being connected by one or more supports at a plurality of locations spread two-dimensionally over the exterior first and second surfaces of the cells, the one or more supports defining the connections by fusing between the first cell and the second cell.

9. The metal-air battery of claim 8, wherein each support is formed by heat fusing.

10. The metal-air battery of claim 8, wherein each support is formed by chemical fusing.

11. The metal-air battery of claim 8, wherein the supports comprise a plurality of first protrusions extending from the first surface and a plurality of second protrusions extending from the second surface, and the connection is formed by heating at least some of the protrusions on at least one of the cells and abutting the first protrusions of the first cell against the second protrusions of the second cell.

12. The metal-air battery of claim 8, wherein the supports comprise a plurality of first protrusions extending from the first surface and a plurality of second protrusions extending from the second surface, and the connection is formed by applying solvent to at least some of the protrusions on at least one of the cells and abutting the first protrusions of the first cell against the second protrusions of the second cell.

13. The metal-air battery of claim 8, wherein the supports comprise a plurality of first protrusions extending from the first surface, and the connection is formed by heating at least some of the first protrusions on the first cell and abutting the first protrusions of the first cell against the second surface of the second cell.

14. The metal-air battery of claim 8, wherein the supports comprise a plurality of first protrusions extending from the first surface, and the connection is formed by applying solvent to at least some of the first protrusions on the first cell and abutting the first protrusions of the first cell against the second surface of the second cell.

15. The metal-air battery of claim 8, wherein the first surface defines a plurality of openings that are interspersed with the supports and extend through the first surface for supplying air from the air space to a cathode of the first cell and the second surface also defines a plurality of openings extending therethrough for supplying air from the air space to a cathode of the second cell.

16. A metal-air cell, comprising
a case comprising
an interior surface at least partially defining a chamber,
an exterior surface, and
a plurality of first protrusions integrally formed with the case and extending from the exterior surface, the first protrusions distributed over an area of the exterior surface and displaced from one another; and
an anode and a cathode disposed within the chamber.

17. The metal-air cell of claim 16, wherein the case defines a plurality of openings extending between the exterior surface and the interior surface for supplying air from an air space adjacent the exterior surface to the cathode within the chamber, and
wherein the first protrusions are interspersed with the openings and extend into the air space.

18. The metal-air cell of claim 16,
wherein the first protrusions extend in a first direction to a first distance from the exterior surface, and
wherein the case further comprises a second plurality of protrusions that are interspersed with the first protrusions, integrally formed with the case, and extend in the first direction to a second distance from the exterior surface that is greater than the first distance.

19. The metal-air cell of claim 16,
wherein the first protrusions extend in a first direction to a third distance from the exterior surface.

* * * * *